(12) United States Patent
Wasilewski et al.

(10) Patent No.: US 7,515,712 B2
(45) Date of Patent: Apr. 7, 2009

(54) MECHANISM AND APPARATUS FOR ENCAPSULATION OF ENTITLEMENT AUTHORIZATION IN CONDITIONAL ACCESS SYSTEM

(75) Inventors: Anthony J. Wasilewski, Alpharetta, GA (US); Jeffery M. Seaman, Lilburn, GA (US); Darryl L. Defreese, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/981,347

(22) Filed: Mar. 25, 2005

(65) Prior Publication Data

US 2005/0152551 A1 Jul. 14, 2005

Related U.S. Application Data

(63) Continuation of application No. 09/475,696, filed on Dec. 30, 1999, which is a continuation of application No. 09/111,958, filed on Jul. 8, 1998, now abandoned.

(60) Provisional application No. 60/054,578, filed on Aug. 1, 1997.

(51) Int. Cl.
*H04N 7/167* (2006.01)
*H04N 7/16* (2006.01)

(52) U.S. Cl. .................. 380/239; 380/210; 726/26; 726/27; 726/29; 725/25; 725/27

(58) Field of Classification Search ............ 725/25, 725/31
See application file for complete search history.

(56) References Cited

U.S. PATENT DOCUMENTS 4,155,042 A 5/1979 Permut et al.

(Continued)

FOREIGN PATENT DOCUMENTS

EP 0 723 371 A 7/1996

(Continued)

OTHER PUBLICATIONS

Walter Chen, "Home Networking: Understanding Coaxial Cable", pp. 1-4.*

(Continued)

*Primary Examiner*—Ponnoreay Pich (57) ABSTRACT

A method for determining whether the terminal is authorized to receive the selected service is practiced in a terminal of a conditional access system in which a user selects a service, the selected service being associated with a frequency, the terminal having a tuner and a secure element with at least one authorized entitlement unit number stored therein. The method includes receiving at least one encrypted entitlement control message corresponding to the service, and decrypting each of the at least one encrypted entitlement control message in the secure element, each decrypted entitlement control message revealing at least one first entitlement number associated with the selected service. The method further includes determining that the terminal is authorized to receive the selected service when any first entitlement number of any decrypted entitlement control message represents any number of the at least one authorized entitlement unit number. Alternatively, the method includes receiving at least one entitlement control message corresponding to the service, and authenticating each of the at least one entitlement control message in the secure element, each authenticated entitlement control message revealing at least one first entitlement number associated with the selected service. The method further including determining that the terminal is authorized to receive the selected service when any first entitlement number of any authenticated entitlement control message represents any number of the at least one authorized entitlement unit number.

37 Claims, 4 Drawing Sheets

U.S. PATENT DOCUMENTS

| | | | |
|---|---|---|---|
| 4,358,672 A | 11/1982 | Hyatt et al. | |
| 4,388,643 A | 6/1983 | Aminetzah | |
| 4,405,829 A | 9/1983 | Rivest et al. | |
| 4,531,020 A | 7/1985 | Weschselberger et al. | |
| 4,599,647 A | 7/1986 | George et al. | |
| 4,600,921 A | 7/1986 | Thomas et al. | |
| 4,613,901 A | 9/1986 | Gilhousen et al. | |
| 4,634,807 A | 1/1987 | Chorley et al. | |
| 4,649,533 A | 3/1987 | Chorley et al. | |
| 4,658,093 A | 4/1987 | Hellman | |
| 4,712,238 A | 12/1987 | Gilhousen et al. | |
| 4,712,239 A | 12/1987 | Frezza | |
| 4,736,422 A | 4/1988 | Mason | |
| 4,823,385 A | 4/1989 | Hegendörfer | |
| 4,837,820 A * | 6/1989 | Bellavia, Jr. | 380/209 |
| 4,862,268 A * | 8/1989 | Campbell et al. | 348/463 |
| 4,864,615 A | 9/1989 | Bennett et al. | |
| 4,866,770 A | 9/1989 | Seth-Smith et al. | |
| 4,885,777 A | 12/1989 | Takaragi et al. | |
| 4,887,296 A | 12/1989 | Horne | |
| RE33,189 E | 3/1990 | Lee et al. | |
| 4,912,762 A | 3/1990 | Lee et al. | |
| 4,937,866 A | 6/1990 | Crowther et al. | |
| 4,980,912 A | 12/1990 | Welmer | |
| 4,982,430 A | 1/1991 | Frezza et al. | |
| 4,993,068 A | 2/1991 | Piosenka et al. | |
| 5,003,591 A | 3/1991 | Kauffman | |
| 5,018,196 A | 5/1991 | Takaragi et al. | |
| 5,029,207 A | 7/1991 | Gammie | |
| 5,036,537 A | 7/1991 | Jeffers et al. | |
| 5,073,935 A | 12/1991 | Pastor | |
| RE33,808 E | 1/1992 | Wright, Jr. | |
| 5,124,117 A | 6/1992 | Tatebayashi et al. | |
| 5,142,578 A | 8/1992 | Matyas et al. | |
| 5,151,782 A | 9/1992 | Ferraro | |
| 5,155,591 A | 10/1992 | Wachob | |
| 5,175,765 A | 12/1992 | Perlman | |
| 5,231,664 A | 7/1993 | Bestler et al. | |
| 5,231,665 A | 7/1993 | Auld et al. | |
| 5,235,643 A | 8/1993 | Anderson et al. | |
| 5,237,610 A | 8/1993 | Gammie et al. | |
| 5,243,652 A | 9/1993 | Teare et al. | |
| 5,249,230 A | 9/1993 | Mihm, Jr. | |
| 5,270,822 A | 12/1993 | Choi | |
| 5,282,248 A | 1/1994 | DeJoy | |
| 5,282,249 A | 1/1994 | Cohen et al. | |
| 5,285,497 A | 2/1994 | Thatcher, Jr. | |
| 5,301,233 A | 4/1994 | Coutrot et al. | |
| 5,341,425 A | 8/1994 | Wasilewski et al. | |
| 5,343,527 A | 8/1994 | Moore | |
| 5,381,477 A | 1/1995 | Beyers, III et al. | |
| 5,381,481 A | 1/1995 | Gammie et al. | |
| 5,400,401 A | 3/1995 | Wasilewski et al. | |
| 5,402,490 A | 3/1995 | Mihm, Jr. | |
| 5,414,773 A | 5/1995 | Handelman | |
| 5,420,866 A | 5/1995 | Wasilewski | |
| 5,425,101 A | 6/1995 | Woo et al. | |
| 5,432,542 A | 7/1995 | Thibadeau et al. | |
| 5,440,633 A | 8/1995 | Augustine et al. | |
| 5,465,299 A | 11/1995 | Matsumoto et al. | |
| 5,473,692 A | 12/1995 | Davis | |
| 5,481,542 A | 1/1996 | Logston et al. | |
| 5,481,613 A | 1/1996 | Ford et al. | |
| 5,488,410 A | 1/1996 | Lieberfarb et al. | |
| 5,497,422 A | 3/1996 | Tysen et al. | |
| 5,499,294 A | 3/1996 | Friedman | |
| 5,499,295 A | 3/1996 | Cooper | |
| 5,506,904 A | 4/1996 | Sheldrick et al. | |
| 5,509,073 A | 4/1996 | Monnin et al. | |
| 5,519,780 A | 5/1996 | Woo et al. | |
| 5,523,781 A | 6/1996 | Brusaw | |
| 5,524,052 A | 6/1996 | Augustine et al. | |
| 5,550,984 A | 8/1996 | Gelb | |
| 5,557,678 A | 9/1996 | Ganesan | |
| 5,557,765 A | 9/1996 | Lipner et al. | |
| 5,559,889 A | 9/1996 | Easter et al. | |
| 5,563,950 A | 10/1996 | Easter et al. | |
| 5,565,909 A | 10/1996 | Thibadeau et al. | |
| 5,568,552 A | 10/1996 | Davis | |
| 5,568,554 A | 10/1996 | Eastlake, 3rd | |
| 5,583,939 A | 12/1996 | Chang et al. | |
| 5,588,058 A | 12/1996 | Le Berre | |
| 5,590,202 A | 12/1996 | Bestler et al. | |
| 5,600,378 A * | 2/1997 | Wasilewski | 348/468 |
| 5,621,793 A | 4/1997 | Bednarek et al. | |
| 5,671,276 A | 9/1997 | Eyer et al. | |
| 5,675,649 A | 10/1997 | Brennan et al. | |
| 5,734,589 A * | 3/1998 | Kostreski et al. | 715/716 |
| 5,740,246 A | 4/1998 | Saito | |
| 5,742,677 A | 4/1998 | Pinder et al. | |
| 5,742,681 A | 4/1998 | Giachetti et al. | |
| 5,764,770 A | 6/1998 | Schipper et al. | |
| 5,787,172 A | 7/1998 | Arnold | |
| 5,793,427 A * | 8/1998 | Mills et al. | 348/391.1 |
| 5,799,081 A | 8/1998 | Kim et al. | |
| 5,802,063 A | 9/1998 | Deiss | |
| 5,857,020 A | 1/1999 | Peterson, Jr. | |
| 5,862,220 A | 1/1999 | Perlman | |
| 5,870,474 A | 2/1999 | Wasilewski et al. | |
| 5,920,626 A | 7/1999 | Durden et al. | |
| 5,991,400 A * | 11/1999 | Kamperman | 380/239 |
| 6,005,938 A * | 12/1999 | Banker et al. | 380/239 |
| 6,035,037 A * | 3/2000 | Chaney | 380/227 |
| 6,067,564 A | 5/2000 | Urakoshi et al. | |
| 6,105,134 A | 8/2000 | Pinder et al. | |
| 6,246,767 B1 | 6/2001 | Akins, III et al. | |
| 6,594,361 B1 * | 7/2003 | Chaney et al. | 380/221 |

FOREIGN PATENT DOCUMENTS

| | | |
|---|---|---|
| EP | 0 752 786 A | 1/1997 |
| WO | WO 94/13107 A | 6/1994 |
| WO | WO 95/29560 A | 11/1995 |

OTHER PUBLICATIONS

Benoit M. Macq and Jean-Jacques Quisquater; proceedings of the IEEE, vol. 83, No. 6, Jun. 1995, entitled "Cryptology for Digital TV Broadcasting", 14 pages.

Office Action dated Dec. 14, 2007 for U.S. Appl. No. 09/475,696.

ISO/IEC 13818-1, "Information Technology—Generic Coding of Moving Pictures and Associated Audio Systems," Draft of: Nov. 13, 1994.

ISO/IEC JTC1/SC29/WG11, "Universal Multi-Program Multiplex and Transport for MPEG-2 Systems," Jan. 1993.

ISO/IEC JTC1/SC29/WG11, "An MGEG-2 Multi-Program Multiplex Syntax," Jan. 1993.

ISO/IEC JTC1/SCE/WG11, "Requirements and Method for High-Level Multiplexing of MPEG and Other Digital Service Bitstreams with Universal Transport Layer," Nov. 1992.

Whitfield, Diffie, "Authentication and Authenticated Key Exchanges," Designs, Codes and Crytography, An International Journal, vol. 2, No. 2, Jun. 1992, pp. 107-125.

Schnneier, Bruce, "Applied Cryptography Second Edition: Protocols, Algorithms and Source Code in C," pp. 357-363.

Menezes, Alfred J., "Handbook of Applied Cryptography," pp. 506-525.

TM-1244 Rev. 4, "Final Technical Report of the Conditional Access Specialist Group," Nov. 17, 1994.

Coutrot et al., "A Single Conditional Access System for Satellite-Cable and Terrestrial TV," IEEE Transactions on Consumer Electronics, vol. 35, No. 3, Aug. 1989, pp. 464-468.

Louis Claude Guillou and Jean-Luc Giachetti, "Encipherment and Conditional Access," SMPTE Journal, 103 (1994) June, No. 6, White Plains, NY.

FIPS PUB 140-1, "Security Requirements for Cryptographic Modules," Computer Systems Laboratory National Institute of Standards and Technology, Gaithersburg, MD 20899, Jan. 11, 1994

FIPS PUB 46-2, "Data Encryption Standard (DES)," Computer Systems Laboratory National Institute of Standards and Technology, Gaithersburg, MD 20899, Dec. 30, 1993.

FIPS PUB 171, "Key Management Using ANSI X9.17," U.S. Department of Commerce, Technology Administration, National Institute of Standards and Technology, Gaithersburg, MD 20899, Apr. 27, 1992.

"Functional Model of a Conditional Access System," A preprint form the EBU Technical Review No. 266 (Winter 1995/6), EBU Project Group B/CA, Published by the European Broadcasting Union, Case Postale 67, CH-1218 Grand-Saconnex, Geneva, Switzerland.

FIPS PUB 81, "Des Modes of Operation," retrieved from the internet on Apr. 27, 1998, http://www.nist.gov/itl/div897/pubs/fip81.htm.

FIPS 74, "Guidelines for Implementing and Using the NBS Data Encryption Standard," National Technical Information Service, U.S. Department of Commerce, Springfield, VA 22161, Apr. 1, 1981.

* cited by examiner

MECHANISM AND APPARATUS FOR ENCAPSULATION OF ENTITLEMENT AUTHORIZATION IN CONDITIONAL ACCESS SYSTEM

CROSS-REFERENCE TO RELATED APPLICATIONS

This application is a continuation of U.S. non-provisional application Ser. No. 09/475,696, DeFreese et al., filed on Dec. 30, 1999, entitled "Mechanism and Apparatus for Encapsulation of Entitlement Authorization in Conditional Access System, which is a continuation of U.S. non-provisional application Ser. No. 09/111,958, DeFreese et al., filed Jul. 8, 1998 now abandoned entitled "Mechanism and Apparatus for Encapsulation of Entitlement Authorization in Conditional Access System" which claimed priority to U.S. provisional application Ser. No. 60/054,578, DeFreese et al., filed Aug. 1, 1997 entitled "Mechanism and Apparatus for Encapsulation of Entitlement in Conditional Access System".

BACKGROUND OF THE INVENTION

1. Field of the Invention

The present invention relates to a conditional access system such as a conditional access cable television system. In particular, the invention relates to identification of packages of bundled services, called entitlement units, and the authorization of reception of an entire entitlement unit.

2. Description Of Related Art

Known conditional access systems individually authorize each service to be received. For example, a subscriber of a cable television system may subscribe to a plurality of services (e.g., HBO, Cinemax, ShowTime, etc.).

Known conditional access systems provide services to subscribers in tiers. Tiers are used as a way to provide standard service to some subscribers while providing premium services to other subscribers. Each subscriber is assigned to a specific tier. For example, consider a service that provides two tiers: a standard-service that carries over the air broadcast programs and a premium service that carries the standard service plus HBO, Cinemax and ShowTime. Tier authorization data is transmitted from the system's headend to a home communication terminal for each subscriber where it is stored. In this example, the tier authorization data may be a single bit set to indicate premium service and cleared to indicate standard service. In general, many tiers (e.g., 256) may be provided. The tier authorization data may be a number (e.g., from 0 to 255) that indicates the authorized tier. Each tier corresponds to a specific combination of authorized programs out of a list of available programs (e.g., out of 128 available programs). Alternatively, the tier authorization data may be a long data word (e.g., 128 bits or 16 bytes of 8 bit each) where each bit in the tier authorization data corresponds to an authorized program. The tier authorization data in this example is merely the long data word with as many bits set as there are authorized programs for the tier, and the identification of the authorized programs is by noticing the bit position that is set.

No matter how the tier authorization data is encoded, it is transmitted from the headend to a subscriber's home communication terminal. Each subscriber is authorized for a particular tier. A table that relates the tier authorization data for each subscriber to the correspondingly identified home communication terminal is stored in the headend. For each subscriber, the headend prepares a unique addressed message containing the tier authorization data corresponding to the subscriber, and the headend transmits the data to the subscriber's home communication terminal. Often the data is encrypted by the headend and decrypted by the home communication terminal.

Programs broadcast from the headend are identified by frequency, channel number, digital data stream number, etc. The home communications terminal processes a subscriber's request for a particular program by determining a number associated with the requested program and verifying that the terminal is authorized to receive a tier that "contains" the program.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
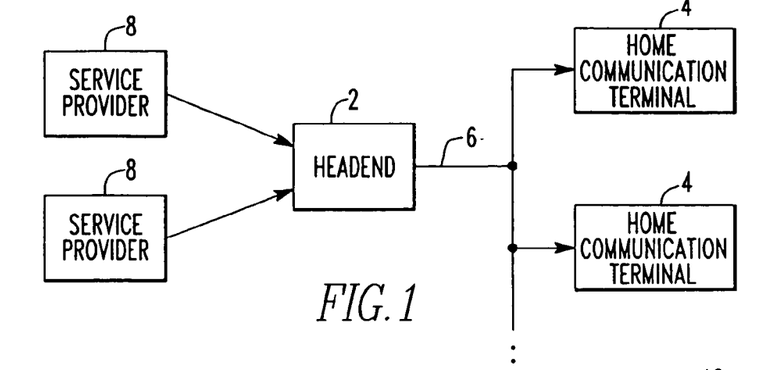
FIG. 1 is a block diagram of the communication system according to the invention.

In FIG. 1, a conditional access communication system includes headend 2, a plurality of home communication terminals 4, and a link therebetween 6. The headend operator may receive content for transmission from a plurality of service providers 8.

Figure 2:
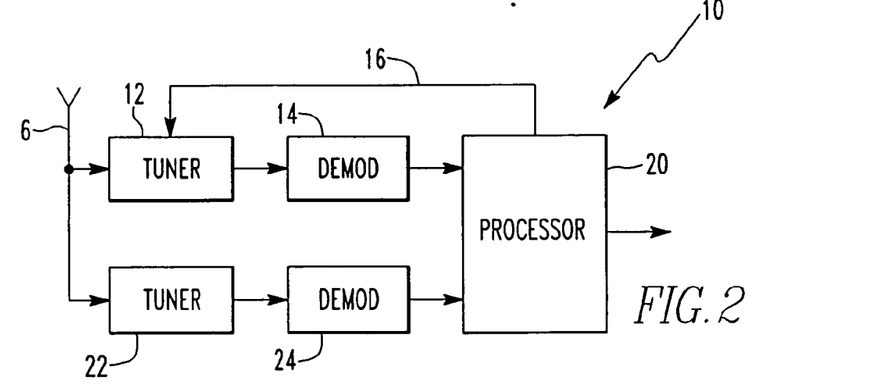
FIG. 2 is a block diagram of a terminal according to the invention.

In FIG. 2, terminal 10 (e.g., as included in home communications terminal 4) includes processor 20, tunable tuner 12, demodulator 14, and control link 16 to control the frequency of tunable tuner 12. Terminal 10 may also include second tuner 22 and demodulator 24 to receive "out of band" data streams.

In operation, headend operators provide a plurality of services. Usually each service is carried on a separate 6 MHZ channels. To receive a particular service, processor 20 directs tunable tuner 12 by control link 16 to tune to the frequency of the particular service desired. Demodulator 14 demodulates the tuned signal according to its modulation technique (e.g., PSK, QPSK (Quadrature Phase Shift Keying Modulation), Offset QPSK, etc.). Standards have been developed for carrying wideband video and audio information for a program (e.g., MPEG-2). However, some systems may carry non-MPEG (Moving Picture Experts Group) compliant signals (e.g., IP packets). When this occurs, terminal 10 may include second tuner 22 and demodulator 24 to recover non-MPEG compliant data. Both data streams are processed in processor 20, or separate but coupled processors may be provided.

Figure 3:
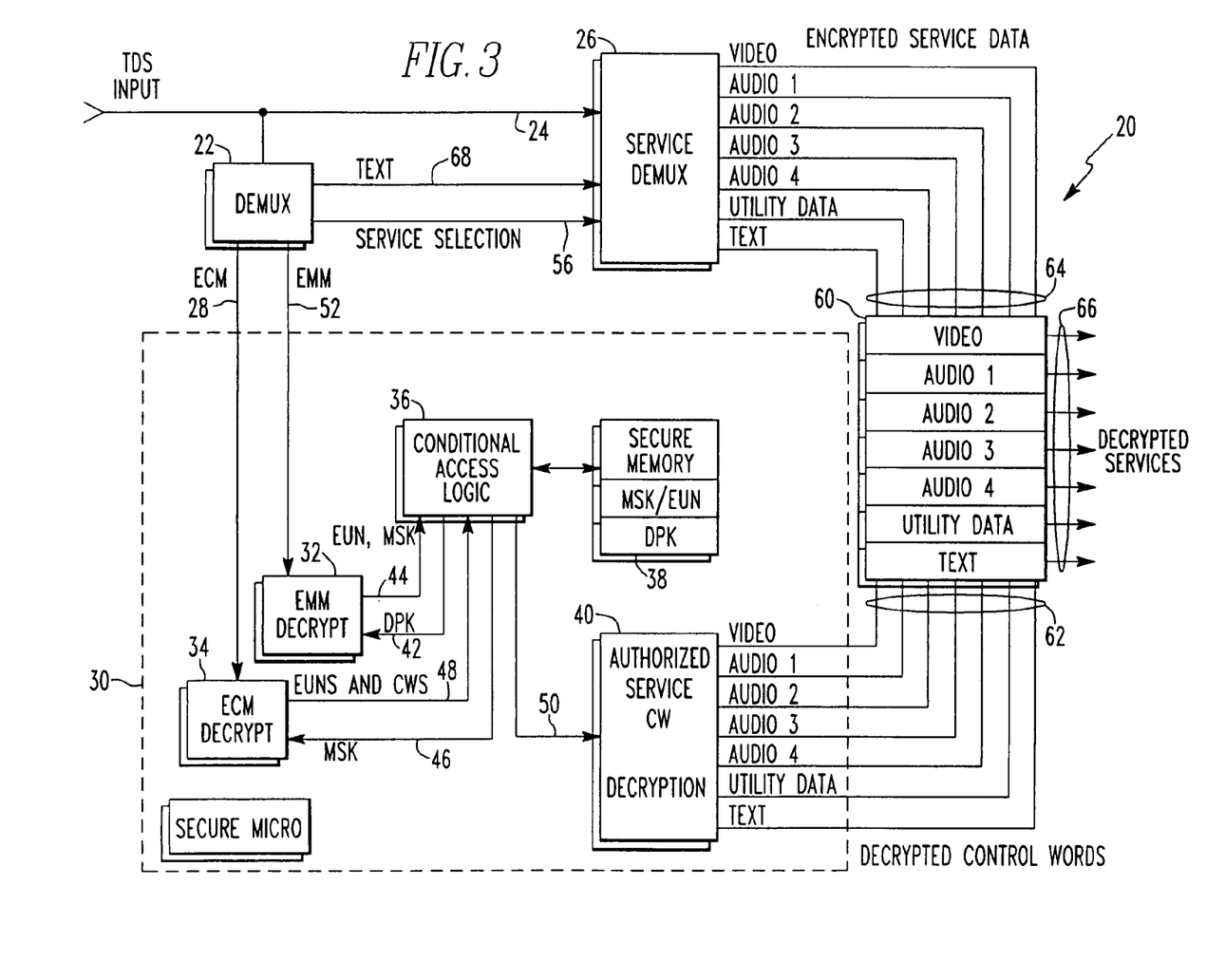
FIG. 3 is a block diagram of a processor of the terminal according to the invention.

In FIG. 3, a more detailed description of processor 20 is depicted. Processor 20 includes secure microprocessor 30 and individual service decryptors 60. Processor 20 also includes demultiplexer 22 to cull encrypted and/or authenticated entitlement control message 28 from the transport data stream input and to cull encrypted entitlement management message 52 from the transport data stream input. Demultiplexer 22 also culls clear payload text 68 from the transport data stream which is provided to service demultiplexor 26. The transport data stream (TDS) is also provided at 24 to service demultiplexor 26 and may include video signals, a plurality of audio signals, or utility information. Any or all of these separate information data streams may be separately encrypted. If these information data streams are separately encrypted they will be decrypted, if authorized, in service descriptor 60 as discussed below.

Secure microprocessor 30 includes secure memory 38 that stores multi-session key (MSK), entitlement unit number and a decoder private key (DPK). Secure microprocessor 30 also includes decryptor 32, decryptor and/or authenticator 34, conditional access logic 36 and authorized control word decryptors 40. Decryptors 32 and 40, decryptor and/or authenticator 34 and conditional access logic 36 may advantageously be implemented in a general purpose arithmetic/logic section and program memory section (having a program stored therein) of secure microprocessor 30. Secure microprocessor 30 is characterized by memory 38 being unobservable at the input/output terminals of secure microprocessor 30. Thus, any intermediate unencrypted data may be stored in memory 38 (preferably non-volatile) without being observable by pirates. Data transferred into or out of secure microprocessor 30 is preferably protected at the terminals of microprocessor 30 by encryption if the data is long lived or remains unprotected if the data is so short lived that its observation by a pirate is harmless. For example, multi-session key is preferably stable for a period of hours to a month or so. Thus, it is preferably encrypted. In contrast, control words that are decrypted in secure microprocessor 30 from encrypted entitlement control messages typically change every 2 to 5 seconds so that observation of the control word by a pirate does not seriously compromise the system's security.

When entitlement control messages are transported in the transport data stream in encrypted form, a pirate is unable to observe the entitlement unit numbers and control words contained in the entitlement control message. However, the entitlement control message may also be transported in authenticated form (e.g., keyed secure hash). In authenticated form, the entitlement control message includes two parts: a clear text part and a hashed part. The entitlement control message is authenticated in authenticator 34 of secure microprocessor 30 (FIG. 3) by hashing the clear text part and comparing it to the hashed part of the entitlement control message. If they agree, then the entitlement control message is authenticated. A pirate may be able to observe the clear text part of the entitlement control message; however, if a pirate were to attempt to insert an additional entitlement unit number into the entitlement control message, the comparison of the hashed part and the results of the local hashing will fail. This reveals a modification of the entitlement control message, and the modified message is ignored.

In operation, demultiplexor 22 culls encrypted entitlement management message 52 from the transport or "out of band" data stream and provides it to decryptor 32. Decoder private key is read from secure memory 38 passed through conditional access logic 36 to decryptor 32 where it is used to decrypt and/or authenticate entitlement management message 52. Decoder private key may be a secret key such as those used in the Data Encryption Standard (DES) algorithm or must be the private component of a public/private key pair such as those used in the RSA algorithm. The entitlement management message includes both authorized entitlement unit number to be stored in secure memory 38 and authorized multi-session key to be stored in secure memory 38. Multi-session key is changed from time to time, preferably monthly or more often. When a subscriber wishes to upgrade service and be authorized to receive additional services (e.g., change from HBO only to HBO and Cinemax), a new entitlement management message will be transmitted to the secure microprocessor so that a new entitlement unit number will be recovered by decryptor 32 and stored in secure memory 38.

Encrypted and/or authenticated entitlement control message 28 is culled from the transport data stream input and provided to decryptor and/or authenticator 34. Multi-session key is read from secure memory 38 and passed through conditional access logic 36 to decryptor and/or authenticator 34 at 46. Decryptor and/or authenticator 34 decrypts and/or authenticates the entitlement control message to reveal encrypted control words for each encypted component (e.g., video, audio, etc.) of the service being carried on the transport data stream and to reveal a list of all entitlement unit numbers to which the currently received service belongs. For example, a first entitlement unit may include both HBO and Cinemax, whereas a second entitlement unit may include only HBO. The entitlement control message for the HBO service (i.e., HBO data stream) would include both the first and second entitlement unit numbers.

Conditional access logic 36 compares the list of entitlement unit numbers from decryptor and/or authenticator 34 with the authorized entitlement unit number stored in secure memory 38. If there is a match, then the service may be received. Conditional access logic 36 will then pass the control words from the decrypted and/or authenticated entitlement control message to the decryptors 40. Control words for individually encrypted service components (e.g., video, audio, etc.) are passed to decryptor 40. In decryptor 40, the control words will be decrypted using the multi-session key to provide clear text versions of the control words, or "service seeds" 62.

Control words are characterized by frequent changes. Whereas, multi-session key may change as infrequently as once a month, control words may change every two to five seconds. The decrypted control words are provided by decryptor 40 at output terminals of secure microprocessor 30. Even if a pirate were to recover a decrypted control word, the decrypted control word is short lived so as to have substantially no value to the pirate.

Service selection data 56 from the decrypted contents from decryptor and/or authenticator 34 is provided to service demuliplexor 26 via control access logic 36. Selected services 64 are provided by service demultiplexor 26 to service decryptor 60 at 64 based on service selection 56. Service decryptor 60 processes encrypted services of the selected services 64 using seeds 62 to provide decrypted services 66.

Figure 4:
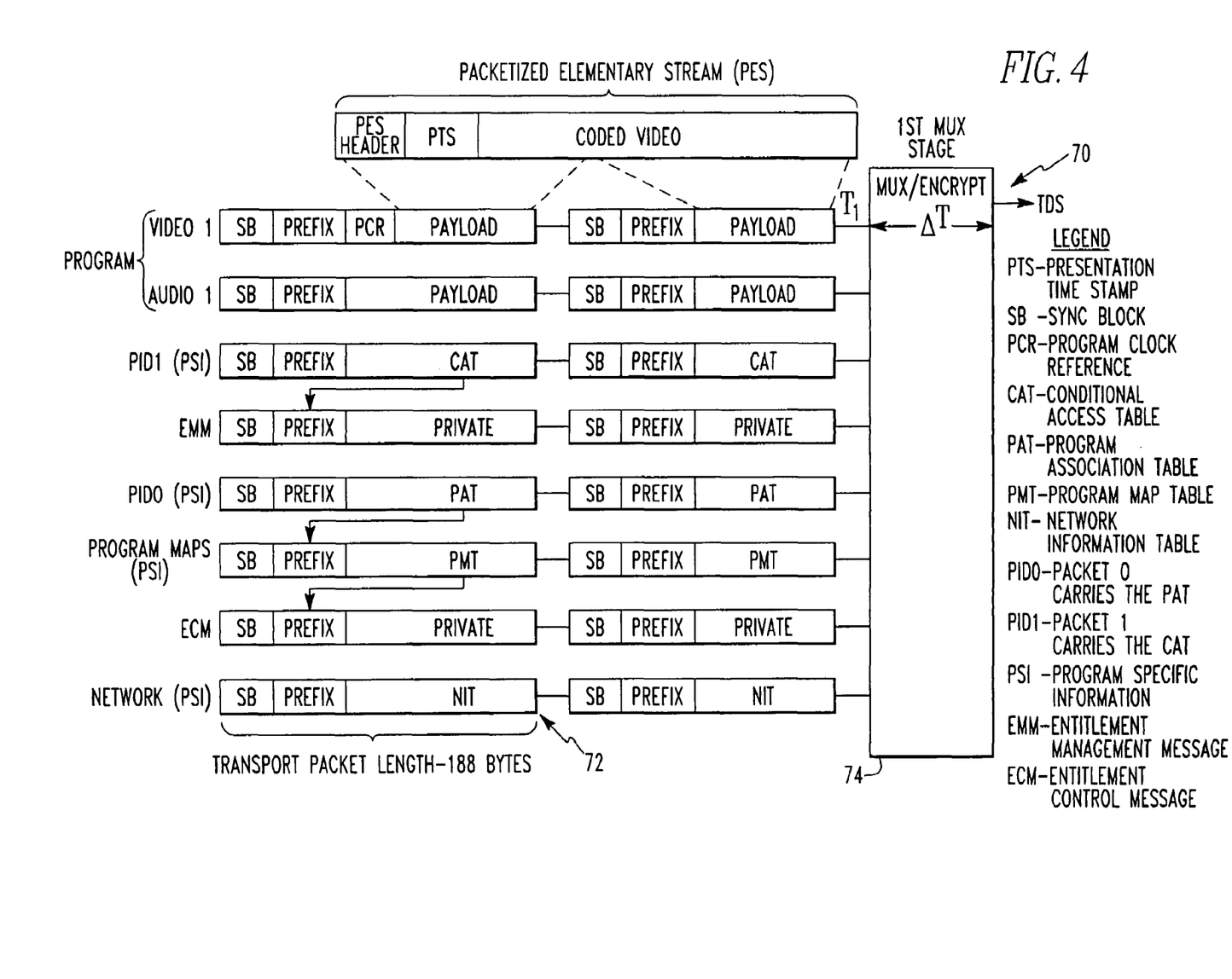
FIG. 4 is a format diagram of a packetized data transport stream (a multiplex) as processed by the invention.

In FIG. 4, a representative transport data stream 70 (called a multiplex) is depicted. The transport data stream is packetized in packets of 188 bytes. Each packet includes a synchronization block and a prefix. Payload data may be concatenated between a plurality of transport packets to form a packetized elementary stream as depicted at the top of FIG. 4. One packetized elementary stream depicted at the bottom of FIG. 4 is the network information table (NIT). The network information table carries such information as a table of direct correspondence between a multiplex number and a frequency (for tuner 12 of FIG. 2) in which the data stream may be found.

Other information may be provided with the network information table. For example, entitlement unit table (EUT) in which each service, identified by universal service identification number (USID) is included together with each entitlement unit number to which the service belongs. Alternatively, the entitlement unit table may be transported "out of band" and received in processor 20 via tuner 22 and demodulator 24 (FIG. 2).

Similarly, in order to aid a user to select a desired service, service information may be provided over a permanently available data link (e.g., a data link not switched with the selected program) as either "in band" or "out of band" data. For example, an out of band data link may be a 108 MHz phase shift keyed (e.g., QPSK) broadcast data link. In band might be specific data packets in the data stream at a predetermined initial tuned frequency. Permanently available in band data link data might also be data packets carried in the data stream of all tunable frequencies. Such service information provides a list of services (i.e., universal service identification numbers) corresponding to each data stream number. Preferably, additional text is carried with the service information for each service so as to enable the terminal to include a electronic program guide.

In FIG. 4, program association table (PAT) is carried as payload data in packet 0 of multiplex 70. The program association table includes a list of each program available and a corresponding packet number at which program map table (PMT) may be found. There is a program map table for each program. The program map table includes a list of each component of the program (e.g., audio and video, entitlement control messages, etc.) and a packet number at which the program component (e.g., audio, video, entitlement control messages, etc.) may be found. Of particular importance is the program component that is the entitlement control message since it specifies all entitlement unit numbers to which the program belongs. The program map table includes information directing where the entitlement control message for that program may be found. This enables demultiplexor 22 (FIG. 3) to cull the encrypted entitlement control message 28 from the transport data stream.

Also of importance is conditional access table (CAT) found in packet 1 of multiplex 70 (FIG. 4). The conditional access table has for each system type of secure microprocessor (e.g., 30 in FIG. 3) in the system, a packet identification number where the encrypted entitlement management messages may be found. This packet number enables demultiplexor 22 to cull the encrypted entitlement management message 52 from the transport data stream (FIG. 3). Further filtering based on the address of the secure micro-processor may then be performed.

Figures 5, 7:
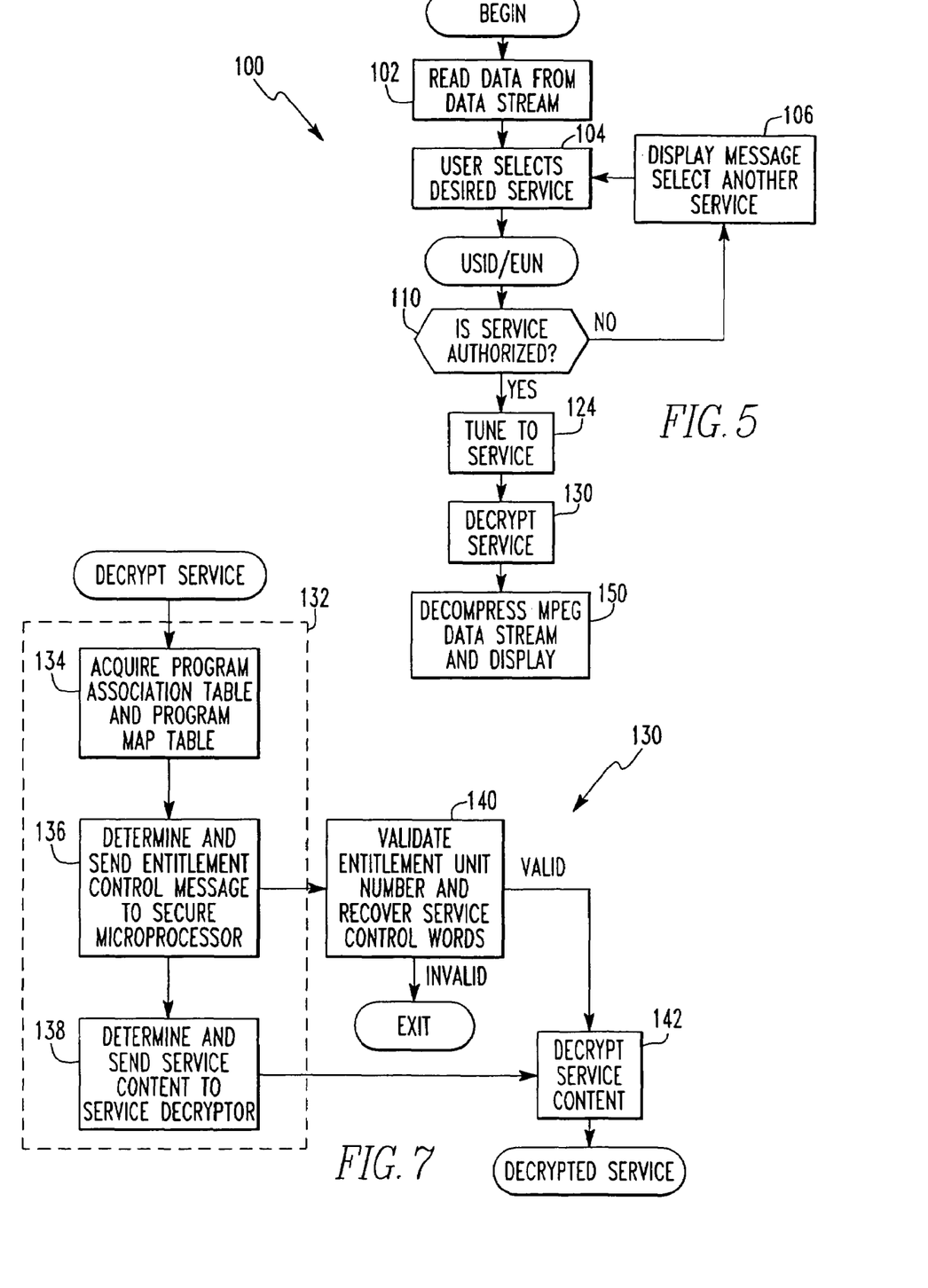
FIG. 5 is a flow chart of a method of determining whether a service is authorized according to the invention.
FIG. 7 is a flow chart of a method of post-confirming authorization.

In FIG. 5, method 100 for determining whether a terminal is authorized to receive a service is practiced in processor 20 (FIG. 2). At step 102 data is read from the data stream. This data includes the entitlement unit table and the service information. At step 104, a user selects a desired service associated with a universal service identification number (e.g., as may be used with an electronic program guide). This may be accomplished through any of the known electronic program guide techniques. The entitlement unit table from the network information helps translate the universal service identification number into entitlement unit numbers that belong to the service. At step 110, the secure microprocessor pre-confirms whether the authorized entitlement unit number stored in secure memory 38 (FIG. 3) is a member of the entitlement unit numbers in the entitlement unit table that corresponds to the selected service. If it is not a member, at step 106, a message may be displayed to the user (e.g., displayed on a television style monitor) and the user will be requested to select another service. Alternatively, the terminal may automatically step to the next service, or to any predetermined service such as a barker channel.

It will be noted that a service pirate may attempt to add extra entitlement unit numbers to the entitlement unit table. However, based on the present invention, the pirate will still be unable to recover the service.

When it is determined at step 110 that a service is authorized, at step 124, tuner 12 is directed to tune to the desired service. This information comes from the network information table that associates the universal service identification number with the frequency on which the service may be received. After tuner 12 tunes to the correct frequency, demodulator 14 recovers the digital data stream carried at the tuned frequency. At step 130 (FIG. 5), the digital data stream is decrypted. At step 150, the decrypted digital data stream is decompressed (e.g., decompression from the compressed MPEG format) and then displayed to the user.

Figure 6:
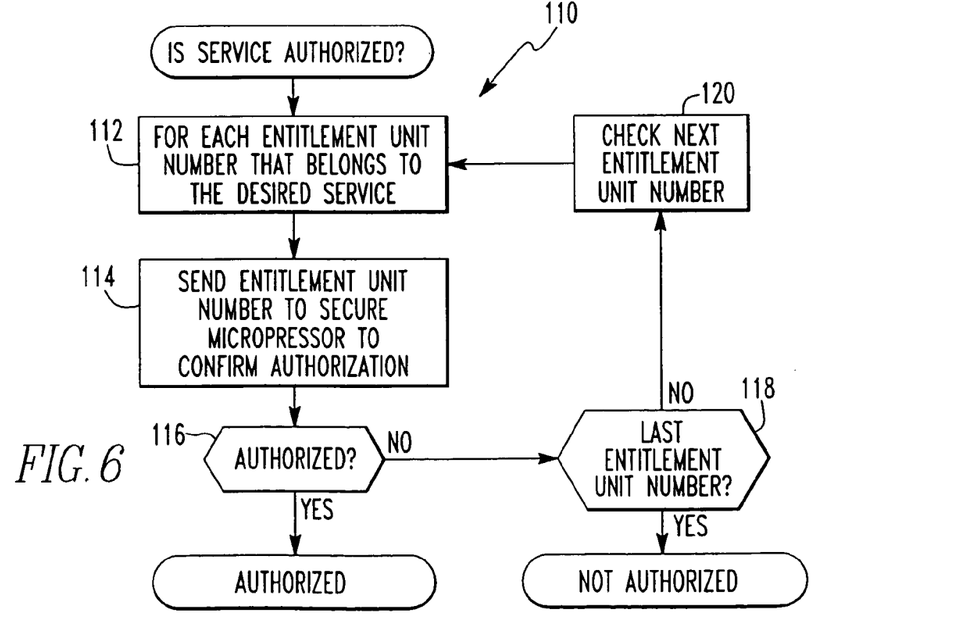
FIG. 6 is a flow chart of a method of pre-confirming authorization.

Step 110 (FIG. 5) is further described with reference to FIG. 6. The entitlement unit table has a list of all entitlement unit numbers that carry the specified service. In a loop that includes steps 112, 114, 116, 118 and 120, all entitlement unit numbers from the entitlement unit table are tested. At step 112, the first (and in later iterations the next) entitlement unit number belonging to the selected service is read from the entitlement unit table. At step 114, the entitlement unit number from the entitlement unit table is sent to the secure microprocessor to be compared to the authorized entitlement unit number stored in secure memory 38 (FIG. 3). If the comparison is favorable, then the service is declared authorized at step 116, and the tuner tunes to the service (step 124, FIG. 5). If the comparison is unfavorable, then at step 118, a test is made to determined whether all entitlement unit numbers from the entitlement unit table have been tested. If all entitlement unit numbers from the entitlement unit table have been tested and none has been the authorized entitlement unit number stored in secure memory 38, then the service is declared not authorized. However, if there are still more entitlement unit numbers from the entitlement unit table to be tested, then the next entitlement unit number is read in steps 120 and 112, and the loop is repeated.

This pre-tuning testing procedure has human factors benefits. Subscribers who tend to "surf" through the channels will tend to grow impatient if the time required to produce a display exceeds 1 second, and this delay will be relatively unnoted if the time to produce the display is less than ¼ of a second. If is therefore desirable to provide a quick way to determine whether a service is authorized or unauthorized before tuner 12 is directed to tune to a particular frequency. It should be noted that the entitlement unit table may not be, and is not required for this purpose, to be secure. It may be sent unencrypted.

In FIG. 7, decrypting the service in step 130 is described in more detail. Processor 20 preferably includes a general purpose microprocessor performing step 132. Step 132 includes acquiring program association table and program map table at step 134.

At step 136, the general purpose microprocessor directs demultiplexor 22 to cull the encrypted and/or authenticated entitlement control message 28 (FIG. 3) from multiplex 70 (FIG. 4). The encrypted and/or entitlement control message is then sent to secure microprocessor 30 (FIG. 3) to be decrypted and/or authenticated.

At step 140, the encrypted and/or authenticated entitlement control message is decrypted and/or authenticated in the secure microprocessor, and the authorized entitlement unit number stored in secure memory 38 (FIG. 3) is compared to the list of entitlement unit numbers to which the present desired service belongs as listed in the decrypted and/or authenticated entitlement control message. This confirmation process takes place after tuner 12 tunes to the desired frequency. Since the entitlement control message is encrypted and/or authenticated, a pirate would not be able to insert false entitlement unit numbers into the entitlement control message without be detected.

When it is confirmed that the authorized entitlement unit number (stored in secure memory 38) is the same as one of the entitlement unit numbers carried in the entitlement control message, one or more control words are recovered from the entitlement control message. These control words correspond to each individual component of the service and are provided at 50 to decryptor 40 (FIG. 3). The control words are decrypted using multi-session key in decryptor 40 to provide seeds for decryption of service components in service decryptor 60.

In step 138 (FIG. 7), service selection data 56 (FIG. 3) from the decrypted and/or authenticated entitlement control message is used by service demultiplexor 26 (FIG. 3) to pass encrypted service component data 64 (e.g., audio or video) to service decryptor 60. In step 142 (FIG. 7), service decryptor 60 decrypts the encrypted service component data 64 using decrypted control words as seeds 62 from decryptor 40 to provide decrypted service components 66 (FIG. 3).

Thus, before tuner 12 (FIG. 2) is tuned, an initial fast, albeit possibly unsecured, determination is made as to whether the selected service is authorized as one of the services covered by the authorized entitlement unit number stored in secure memory 38. If the selected service appears to be an authorized service, then tuner 12 is tuned to the specified frequency and the transport data stream from that specified frequency is processed. In the transport data stream corresponding to the specified frequency is an encrypted and/or authenticated entitlement control message. It is this entitlement control message that is decrypted and/or verified in secure microprocessor 30 in order to reveal, in a secure environment, the entitlement unit numbers that belong to the service. The secure microprocessor compares the list of entitlement unit numbers from the entitlement control message against the authorized entitlement unit number in memory 38 in order to determine whether the service reception is authorized in a secure microprocessor unobservable to pirates.

Since decryption is not required prior to tuning, the pre-tuning steps are performed with great dispatch. A pirate may be able to insert false entitlement unit numbers into the entitlement unit table, but not into the encrypted entitlement control message. Even though a pirate may insert a false entitlement control message into the data stream, it will not be an authenticated entitlement control message. The authentication process carried out in authenticator 34 (FIG. 3) will reveal the deception and the false entitlement control message will be disregarded. Thus, all that a pirate can accomplish is a slowing of the speed at which a user may surf through the channels.

In another embodiment, entitlement control messages are located by index. Entitlement control messages are sent in the MPEG transport stream to provide conditional access information for a given MPEG program. In this embodiment, all entitlement control messages for a given MPEG program are packed into one MPEG PID stream. This reduces the bandwidth required to transmit the entitlement control messages. Separate entitlement control messages are still associated with respective elementary streams (e.g., video or audio) by use of the stream$_{13}$ index discussed below.

Entitlement control messages bearing MPEG packets are mapped to the program elements (e.g., video and each audio data stream) of an MPEG program using a conditional access descriptor (CA_descriptor) as elementary stream (ES) information in the program level of the transport stream program map section. The CA_descriptor identifies the entitlement control message PID that carries all of the conditional access entitlement control messages pertaining to the elementary stream associated with the extended ES information. The CA_descriptor carried in the program map table used as extended ES information includes: a descriptor tag, a descriptor length, a CA_system_PID, a CA_PID, and an ECM_information_descriptor. The descriptor_tag is preferably an 8 bit field defined by MPEG standards to be 0×09 indicating that the CA_descriptor is for a conditional access system. The descriptor length is preferably an 8 bit field representing the number of bytes (or bits, etc.) of the present CA_descriptor. The CA_system ID is preferably a 16 bit field identifying the particular conditional access system to which the CA_descriptor pertains. There may be more than one. The CA_PID is preferably a 13 bit field carrying the PID value of the entitlement control message bearing packets for the associated elementary stream. The ECM_information_descriptor preferably includes one or more 24 bit fields (the number depends on descriptor_length, above) where each 24 bit field includes: an ECM_descriptor_tag, an ECM_descriptor_length, and a stream_index. The ECM_descriptor_tag is an 8 bit field that identifies a characteristic of the associated entitlement control message, for example, identifying the entitlement control message as a stream type descriptor (other descriptor types being possible). The ECM_descriptor_length is an 8 bit field that merely identifies the remaining length of the current ECM_information_descriptor (in bytes). The stream_index is an 8 bit field that identifies the entitlement control messages in a multiple entitlement control message stream that contain information pertaining to the elementary stream associated with the CA_descriptor.

Entitlement control messages for all elementary streams (e.g., video, audio, etc.) of a given program are packed into packets identified by one PID. For example, assume that an MPEG program has (1) a video stream identified by PID 100, an audio stream identified by PID 200, and an entitlement control message stream identified by PID 300. PID 300 contains entitlement control messages used by both the video and audio data streams. The entitlement control messages for each elementary stream are assigned arbitrary but unique and preferred sequential stream index values. For example, entitlement control messages for the video stream (PID 100) may be assigned a stream_index value of 25, and entitlement control messages for the audio stream (PID 200) may be assigned a stream_index value of 50.

The information contained in the transport stream program map table is used to link entitlement control messages to the correct elementary stream. The CA_descriptor (described above) is looked up in the program map table when the program is selected. For the present example, the program map table identifies the video stream as PID 100 and the audio stream as PID 200. The program map table identified the CA_descriptor which in turn identifies the CA system_ID, the CA_PID as 300 (in this example) and the stream_index for the video as 25 and for audio as 50 as discussed above. Thus, home communication terminal 4 (FIG. 1) can identify the PID of the video and audio streams from program map table. Further, home communications terminal identifies one PID (using the CA_descriptor discussed above) for all entitlement control messages associated with the present program. However, it is still possible to maintain separate entitlement control messages for each elementary stream by using the stream_index (as discussed above) for each separate elementary stream.

Having described preferred embodiments of a novel apparatus and method for the encapsulation of entitlement authorization in a conditional access system (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. In a terminal of a conditional access system in which a user selects a service associated with a frequency, the terminal having a tuner and a secure element with at least one authorized entitlement unit number stored therein, a method of determining whether the terminal is authorized to receive the selected service, the method comprising the steps of:
receiving at least one encrypted entitlement control message corresponding to the service, wherein each entitlement control message includes a packet identifier (PID) and a payload;
decrypting each of the at least one encrypted entitlement control messages in the secure element, each decrypted entitlement control message revealing at least one first entitlement unit number associated with the selected service and at least one control word associated with the selected service, wherein the at least one first entitlement unit number and the at least one control word are carried in the payload; and
determining that the terminal is authorized to receive the selected service when the at least one first entitlement unit number of any decrypted entitlement control message corresponds to an authorized entitlement unit number, wherein the authorized entitlement unit number indicates a group of services that a receiver is authorized to receive; and
wherein the method further comprises initial steps of:
receiving over a permanently available data link an unencrypted entitlement unit table, the unencrypted entitlement unit table associating the selected service with at least one second entitlement unit number; and
tuning the tuner of the terminal to the frequency associated with the selected service when any of said at least one second entitlement number represents any number of said at least one authorized entitlement unit number.

2. The method of claim 1, wherein the step of receiving over a permanently available data link includes receiving the entitlement unit table over an out of band data link.

3. The method of claim 1, wherein the step of receiving over a permanently available link includes receiving the entitlement unit table incorporated in a data packet that is included in a data stream associated with an initial power on frequency that is tunable by the tuner.

4. The method of claim 1, wherein the step of receiving over a permanently available link includes receiving the entitlement unit table incorporated in a data packet that is included in a data stream associated with each frequency that is tunable by the tuner.

5. The method of claim 1, wherein the step of decrypting the at least one encrypted entitlement control message includes recovering at least one control word associated with decryption of a video component of the selected service.

6. The method of claim 1, wherein the step of decrypting the at least one encrypted entitlement control message includes recovering at least one control word associated with decryption of an audio component of the selected service.

7. The method of claim 1, wherein the step of receiving at least one encrypted entitlement control message includes demodulating an output of the tuner to recover a data component corresponding to the selected service, the data component containing the encrypted entitlement control message.

8. The method of claim 1, wherein the step of decrypting said at least one encrypted entitlement control message includes recovering at least one control word from said at least one decrypted entitlement control message, each control word being a decryption key for decrypting a corresponding service component of the selected service.

9. The method of claim 8, further comprising steps of:
recovering a first encrypted service component; and
decrypting the first encrypted service component using a first control word of said at least one control word.

10. The method of claim 1, further comprising steps of:
receiving an encrypted entitlement management message addressed to the terminal; and
decrypting the encrypted entitlement management message in the secure element, the decrypted entitlement management message including an update of at least one authorized entitlement unit number to be stored in the secure element.

11. The method of claim 10, wherein the step of receiving an encrypted entitlement management message includes receiving the encrypted entitlement management message over an out of band data link.

12. The method of claim 10, wherein the step of receiving an encrypted entitlement management message includes receiving the encrypted entitlement management message incorporated in a data packet that is included in a data stream associated with each frequency that is tunable by the tuner.

13. The method of claim 1, further comprising steps of:
receiving an entitlement management message addressed to the terminal; and
authenticating the entitlement management message in the secure element, the authenticated entitlement management message including an update of at least one authorized entitlement unit number to be stored in the secure element.

14. The method of claim 13, wherein the step of receiving an entitlement management message includes receiving the entitlement management message over an out of band data link.

15. The method of claim 13, wherein the step of receiving an entitlement management message includes receiving the entitlement management message incorporated in a data packet that is included in a data stream associated with each frequency that is tunable by the tuner.

16. The method of claim 1, wherein the step of decrypting the at least one encrypted entitlement control message includes recovering the at least one first entitlement unit number associated with the selected service.

17. In a terminal of a conditional access system in which a user selects a service associated with a frequency, the terminal having a tuner and a secure element with at least one authorized entitlement unit number stored therein, a method of determining whether the terminal is authorized to receive the selected service, the method comprising the steps of:
receiving at least one entitlement control message corresponding to the service, wherein each entitlement control message includes a packet identifier (PID) and a payload;

authenticating each of the at least one entitlement control messages in the secure element, each authenticated entitlement control message revealing at least one first entitlement unit number associated with the selected service and at least one control word associated with the selected service, wherein the at least one first entitlement unit number and the at least one control word are carried in the payload; and determining that the terminal is authorized to receive the selected service when any first entitlement unit number of any authenticated entitlement control message corresponds to an authorized entitlement unit number, wherein the authorized entitlement unit number indicates a group of services that a receiver is authorized to receive; and wherein the method further comprises initial steps of:
receiving over a permanently available data link an unencrypted entitlement unit table, the unencrypted entitlement unit table associating the selected service with at least one second entitlement unit number; and tuning the tuner of the terminal to the frequency associated with the selected service when any of said at least one second entitlement number represents any number of said at least one authorized entitlement unit number.

18. The method of claim 17, wherein the step of receiving over a permanently available data link includes receiving the entitlement unit table over an out of band data link.

19. The method of claim 17, wherein the step of receiving over a permanently available link includes receiving the entitlement unit table incorporated in a data packet that is included in a data stream associated with an initial power on frequency that is tunable by the tuner.

20. The method of claim 17, wherein the step of receiving over a permanently available link includes receiving the entitlement unit table incorporated in a data packet that is included in a data stream associated with each frequency that is tunable by the tuner.

21. The method of claim 17, wherein the step of authenticating the at least one entitlement control message includes recovering at least one control word associated with decryption of a video component of the selected service.

22. The method of claim 17, wherein the step of authenticating the at least one entitlement control message includes recovering at least one control word associated with decryption of an audio component of the selected service.

23. The method of claim 17, wherein the step of receiving at least one entitlement control message includes demodulating an output of the tuner to recover a data component corresponding to the selected service, the data component containing the entitlement control message.

24. The method of claim 17, wherein the step of authenticating said at least one entitlement control message includes recovering at least one control word from said at least one entitlement control message, each control word being a decryption key for decrypting a corresponding service component of the selected service.

25. The method of claim 24, further comprising step of:
recovering a first encrypted service component; and
decrypting the first encrypted service component using a first control word of said at least one control word.

26. The method of claim 17, further comprising steps of:
receiving an encrypted entitlement management message addressed to the terminal; and
decrypting the encrypted entitlement management message in the secure element, the decrypted entitlement management message including an update of at least one authorized entitlement unit number to be stored in the secure element.

27. The method of claim 26, wherein the step of receiving an encrypted entitlement management message includes receiving the encrypted entitlement management message over an out of band data link.

28. The method of claim 26, wherein the step of receiving an encrypted entitlement management message includes receiving the encrypted entitlement management message incorporated in a data packet that is included in a data stream associated with each frequency that is tunable by the tuner.

29. The method of claim 17, further comprising steps of:
receiving an entitlement management message addressed to the terminal; and
authenticating the entitlement management message in the secure element, the authenticated entitlement management message including an update of at least one authorized entitlement unit number to be stored in the secure element.

30. The method of claim 29, wherein the step of receiving an entitlement management message includes receiving the entitlement management message over an out of band data link.

31. The method of claim 29, wherein the step of receiving an entitlement management message includes receiving the entitlement management message incorporated in a data packet that is included in a data stream associated with each frequency that is tunable by the tuner.

32. The method of claim 17, wherein the step of authenticating the at least one entitlement control message includes recovering the at least one first entitlement unit number associated with the selected service.

33. A system in which a user selects a service associated with a frequency, the system comprising:
a tuner; and
a processor communicatively coupled to the tuner and including a secure element, the processor configured to:
receive a transport stream comprising a plurality of packets having different packet types, one packet type comprising at least one encrypted entitlement control message corresponding to the service, wherein each entitlement control message includes a packet identifier (PID) and a payload, the PID uniquely identifying the packet corresponding to the entitlement control message from the other packet types;

decrypt each of the at least one encrypted entitlement control messages in the secure elements, each decrypted entitlement control message revealing at least one first entitlement unit number associated with the selected service, wherein the at least one first entitlement unit number and the at least one control word are carried in the payload; and determine the terminal is authorized to receive the selected service when the at least one first entitlement unit number of any decrypted entitlement control message corresponds to an authorized entitlement unit number, wherein the authorized entitlement unit number indicates a group of services that a receiver is authorized to receive; and wherein the processor is further configured to perform the initial steps of:
receive over a permanently available data link an unencrypted entitlement unit table, the unencrypted entitlement unit table associating the selected service with at least one second entitlement unit number; and tune the tuner of the terminal to the frequency associated with the selected service when any of said at least one second entitlement number represents any number of said at least one authorized entitlement unit number.

34. The system of claim 33, wherein the different packet types include video packets, audio packets, and entitlement management message packets.

35. In a terminal of a conditional access system in which a user selects a service associated with a frequency, the terminal having a tuner and a secure element with at least one authorized entitlement unit number stored therein, a method of determining whether the terminal is authorized to receive the selected service, the method comprising the steps of:
  receiving at least one encrypted entitlement control message corresponding to the service, wherein each entitlement control message includes a packet identifier (PID) and a payload;
  decrypting each of the at least one encrypted entitlement control messages in the secure element, each decrypted entitlement control message revealing at least one first entitlement unit number associated with the selected service and at least one encrypted control word associated with the selected service, wherein the at least one first entitlement unit number and the at least one encrypted control word are carried in the payload; and
  determining that the terminal is authorized to receive the selected service when the at least one first entitlement unit number of any decrypted entitlement control message corresponds to an authorized entitlement unit number, wherein the authorized entitlement unit number indicates a group of services that a receiver is authorized to receive; and
  wherein the method further comprises initial steps of:
    receiving over a permanently available data link an unencrypted entitlement unit table, the unencrypted entitlement unit table associating the selected service with at least one second entitlement unit number; and
    tuning the tuner of the terminal to the frequency associated with the selected service when any of said at least one second entitlement number represents any number of said at least one authorized entitlement unit number.

36. The method of claim 35, further comprising decrypting said at least one encrypted control word when it is determined that the terminal is authorized to receive the selected service.

37. The method of claim 36, further comprising steps of:
  recovering a first encrypted service component; and
  decrypting the first encrypted service component using a decrypted control word of said at least one encrypted control word.

* * * * *